US008909820B2

(12) United States Patent
Lai et al.

(10) Patent No.: US 8,909,820 B2
(45) Date of Patent: Dec. 9, 2014

(54) DATA TRANSMISSION METHODS AND HUB DEVICES UTILIZING THE SAME

(71) Applicant: Via Technologies, Inc., New Taipei (TW)

(72) Inventors: Jiin Lai, New Taipei (TW); Jinkuan Tang, Beijing (CN)

(73) Assignee: Via Technologies, Inc., New Taipei (TW)

( * ) Notice: Subject to any disclaimer, the term of this patent is extended or adjusted under 35 U.S.C. 154(b) by 2 days.

(21) Appl. No.: 13/716,765

(22) Filed: Dec. 17, 2012

(65) Prior Publication Data

US 2013/0179604 A1     Jul. 11, 2013

(30) Foreign Application Priority Data

Jan. 5, 2012 (CN) .......................... 2012 1 0001510

(51) Int. Cl.
*G06F 3/00*   (2006.01)
*G06F 5/00*   (2006.01)
*G06F 13/38*  (2006.01)
*G06F 11/30*  (2006.01)

(52) U.S. Cl.
CPC .......... *G06F 11/3068* (2013.01); *G06F 13/685* (2013.01)
USPC ................................. 710/16; 710/65; 710/38

(58) Field of Classification Search
None
See application file for complete search history.

(56) References Cited

U.S. PATENT DOCUMENTS

| 8,135,883 | B2 | 3/2012 | Monks et al. |
| 8,656,074 | B2 | 2/2014 | Lai et al. |
| 2012/0290761 | A1* | 11/2012 | Chen et al. ..................... 710/305 |
| 2014/0047142 | A1 | 2/2014 | Lai et al. |

FOREIGN PATENT DOCUMENTS

| CN | 101788972 | 7/2010 |
| CN | 102156680 | 8/2011 |
| TW | M404998 | 6/2011 |
| TW | 201145033 | 12/2011 |

OTHER PUBLICATIONS

English language translation of abstract of CN 101788972 (published Jul. 28, 2010).
English language translation of abstract of CN 102156680 (published Aug. 17, 2011).
English language machine translation of TW M404998 (published Jun. 11, 2011).
English language machine translation of TW 201145033 (published Dec. 16, 2011).

* cited by examiner

*Primary Examiner* — Zachary K Huson
(74) *Attorney, Agent, or Firm* — McClure, Qualey & Rodack, LLP (57) ABSTRACT

A hub device includes an upstream port, multiple downstream ports, a first and a second sub-hub module, a data-format detector, a transaction translator, and a controller. The upstream port is coupled to a host device supporting a first and/or a second data format. Each downstream port is coupled to one of a plurality of slave devices supporting a first and/or a second data format. The first sub-hub module supports transmission of data in the first data format. The second sub-hub module supports transmission of data in the second data format. The data-format detector detects the data format supported by the host device and the slave devices. The transaction translator transforms the data format between the first data format and the second data format. The controller determines whether to control the transaction translator to perform data-format transformation.

16 Claims, 6 Drawing Sheets

DATA TRANSMISSION METHODS AND HUB DEVICES UTILIZING THE SAME

CROSS REFERENCE TO RELATED APPLICATIONS

This Application claims priority of China Patent Application No. 201210001510.1, filed on Jan. 5, 2012, the entirety of which is incorporated by reference herein.

BACKGROUND OF THE INVENTION

1. Field of the Invention

The invention relates to a data transmission method, and more particularly to a hub device and a data transmission method.

2. Description of the Related Art

The Universal Serial Bus (USB), which is a standard for data transmission between a host device and a slave device, is commonly used in electronic devices. The data transmission bandwidth of USB 2.0 (also called high-speed USB) standard is 480 Mbps, and the data transmission bandwidth of USB 3.0 (also called Super Speed USB) is up to 5 Gbps.

Although USB 3.0 is an outstanding new standard, the USB 2.0 devices are still commonly used and continue to be prevalent on the market. Therefore, the USB 2.0 devices cannot be immediately replaced by the USB 3.0 devices. In this regard, the USB 3.0 host devices still have to support both USB 2.0 and 3.0 slave devices.

However, as defined in the USB 3.0 specifications, the USB 3.0 hub device includes a super speed sub-hub for supporting USB 3.0 data transmission and a USB 2.0 sub-hub for supporting USB 2.0 data transmission. Both of them are coupled between an upstream port for connecting to the host device and multiple downstream ports for connecting to the slave devices.

The upstream bus between the super speed sub-hub and the upstream port is USB 3.0 bus, and the upstream bus between the USB 2.0 sub-hub and the upstream port is USB 2.0 bus. When the USB 2.0 slave device is coupled to one of the downstream ports of the hub device, the data transmission path is formed by the USB 2.0 sub-hub through the USB 2.0 bus to the upstream port.

Therefore, when multiple USB 2.0 slave devices are concurrently coupled to the hub device, the slave devices share the 480 Mbps bandwidth of the upstream USB 2.0 bus. For example, when one USB 2.0 slave device is coupled to the hub device, the USB 2.0 slave device can use 480 Mbps bandwidth. When two USB 2.0 slave devices are coupled to the hub device, each USB 2.0 slave device may only use 480/2=240 Mbps bandwidth. When four USB 2.0 slave devices are coupled to the hub device, each USB 2.0 slave device may only use 480/4=120 Mbps bandwidth.

In other words, when multiple USB 2.0 slave devices are concurrently coupled to the hub device, the bandwidth that can be used is limited to the bandwidth of the upstream USB 2.0 bus, while the large bandwidth provided by the USB 3.0 bus between the super speed sub-hub and the upstream port is left unused.

BRIEF SUMMARY OF THE INVENTION

To solve the above-mentioned problems, a hub device and a data transmission method capable of using the upstream bandwidth are provided. In the proposed hub device and data transmission method, data is transformed between the high-speed data format and low-speed data format.

In an aspect of the embodiments of the invention, a hub device comprises an upstream port, a plurality of downstream ports, a first sub-hub module, a second sub-hub module, a data-format detector, a transaction translator and a controller. The upstream port is coupled to a host device supporting a first data format and/or a second data format. Each downstream port is coupled to one of a plurality of slave devices supporting the first data format and/or the second data format. The first sub-hub module supports transmission of data in the first data format between the plurality of downstream ports and the upstream port. The second sub-hub module supports transmission of data in the second data format between the plurality of downstream ports and the upstream port. The data-format detector detects data format supported by the host device and the slave devices. The transaction translator is coupled between the first sub-hub module and the second sub-hub module and coupled to at least one of the plurality of downstream ports for transforming the data format between the first data format and the second data format. The controller controls operations of the first sub-hub module, the second sub-hub module and the transaction translator, and determines whether to control the transaction translator to perform data-format transformation between the first data format and the second data format according to the data format supported by the host device and the slave devices.

In another aspect of the embodiments of the invention, a data transmission method for a hub device comprising an upstream port coupled to a host device supporting a first data format and/or a second data format, a plurality of downstream ports each coupled to one of a plurality of slave devices supporting the first data format and/or the second data format, a first sub-hub module supporting transmission of data in the first data format between the plurality of downstream ports and the upstream port, and a second sub-hub module supporting transmission of data in the second data format between the plurality of downstream ports and the upstream port, comprises: detecting data formats supported by the host device and the slave devices; and when the host device coupled to the upstream port is detected supporting the first data format and one of the slave devices coupled to one of the plurality of downstream ports is detected supporting the second data format, performing data-format transformation between the data in the second data format and the data in the first data format, so that the one of the slave devices supporting the second data format performs data transmission with the host device via the first sub-hub module.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

According to an embodiment of the invention, a hub device may comprise an upstream port coupled to a host device, a plurality of downstream ports each coupled to one of a plurality of slave devices, a first sub-hub module supporting transmission of data in the first data format between the plurality of downstream ports and the upstream port, a second sub-hub module supporting transmission of data in the second data format between the plurality of downstream ports and the upstream port, and a data-format detector detecting data format supported by the host device and the slave devices. The host device and the slave devices support the first data format and/or the second data format. In addition, the hub device may further comprise a transaction translator coupled between the first sub-hub module and the second sub-hub module and coupled to at least one of the plurality of downstream ports for transforming the data format between the first data format and the second data format, and a controller controlling operations of the first sub-hub module, the second sub-hub module and the transaction translator, and determining whether to control the transaction translator to perform data-format transformation according to the data formats supported by the host device and the slave devices.

In an embodiment of the invention, suppose that the data transmission bandwidth of the first data format is greater than that of the second data format. When the host device coupled to the upstream port is detected supporting the first data format, and one of the slave devices coupled to one of the plurality of downstream ports is detected supporting only the second data format, the controller controls the transaction translator to perform data-format transformation between the second data format and the first data format, so that the slave devices may perform data transmission with the host device through the high-speed upstream bus.

In addition, when the host device coupled to the upstream port is detected supporting the first data format, and one slave device coupled to one of the plurality of downstream ports is detected also supporting the first data format, the controller controls data in the first data format to be transmitted directly through the first sub-hub module between the slave device supporting the first data format and the host device. When the host device coupled to the upstream port is detected supporting the second data format, the controller controls data in the second data format to be transmitted directly through the second sub-hub module between the slave devices and the host device.

The data in the second data format is transmitted directly through the second sub-hub module between the host device and the slave device(s) supporting the second data format and coupled to the downstream port(s) which is/are not coupled to the transaction translator, and the data in the first data format is transmitted directly through the first sub-hub module between the host device and the slave device(s) supporting the first data format and coupled to the downstream port(s) which is/are not coupled to the transaction translator.

In another embodiment of the invention, the hub device may comprise a signal switch coupled between the first sub-hub module and the transaction translator. When the host device coupled to the upstream port is detected supporting the first data format and the slave device coupled to one of the plurality of downstream ports is detected supporting the second data format, the signal switch is turned on so as to conduct a signal transmission path between the first sub-hub module and the transaction translator for transforming the data format between the first data format and the second data format.

Take a USB 3.0 hub device to be discussed in the following paragraphs as an example. The first data format is USB 3.0 and the second data format is USB 2.0 or 1.1 (hereinafter collectively referred to as USB 2.0) for illustrating the embodiments of the invention. However, the hub device may also support other data formats and the invention should not be limited thereto.

Figure 1:
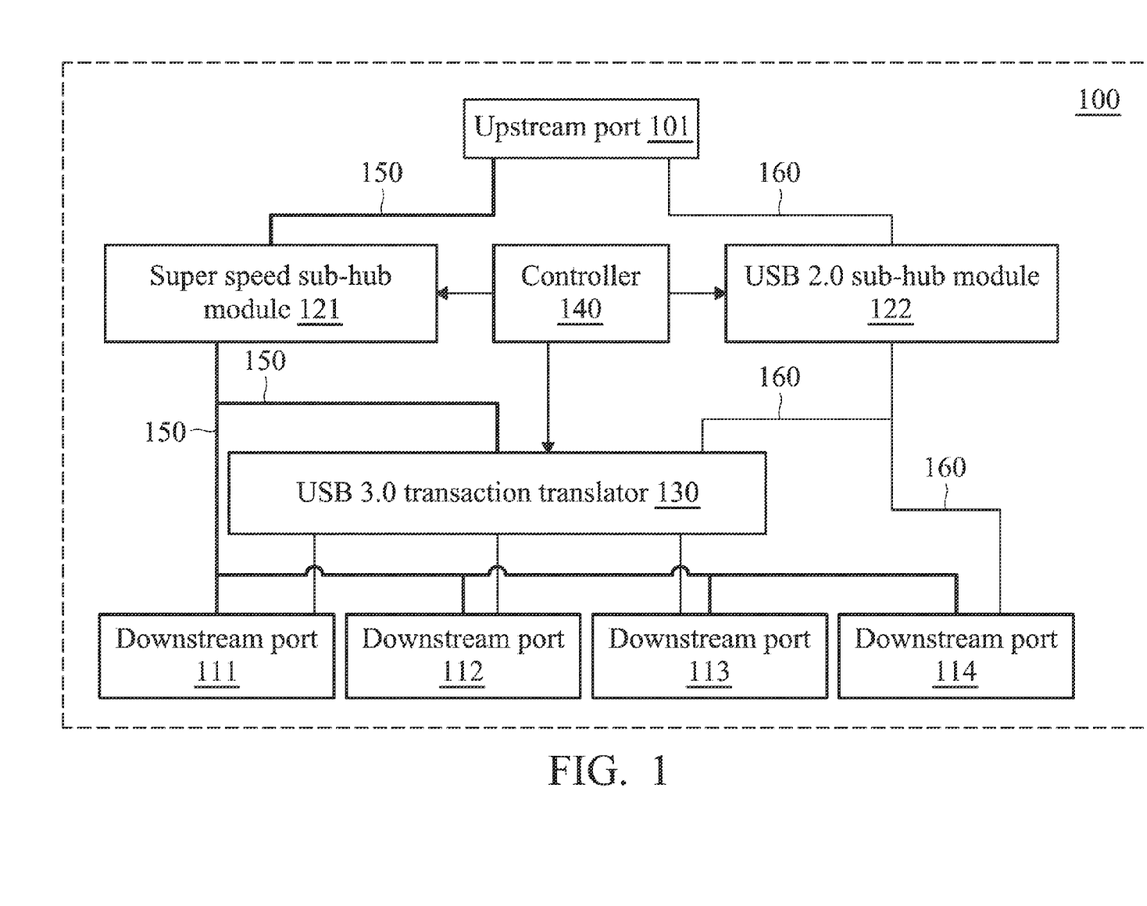
FIG. 1 shows a block diagram of a USB 3.0 hub device according to an embodiment of the invention.

FIG. 1 shows a block diagram of a USB 3.0 hub device 100 according to an embodiment of the invention.

Referring to FIG. 1, the USB 3.0 hub device 100 comprises an upstream port 101 coupled to the host device supporting USB 3.0 and/or USB 2.0, downstream ports 111-114 each coupled to a slave device supporting USB 3.0 and/or USB 2.0, a super speed sub-hub module 121 coupled between the downstream ports 111-114 and the upstream port 101 for transmitting USB 3.0 data, the USB 2.0 sub-hub module 122 coupled between the downstream ports 111-114 and the upstream port 101 for transmitting USB 2.0 data, a data-format detector (not shown) detecting the data formats supported by the host device and the slave device, a USB 3.0 transaction translator 130 coupled between the USB 2.0 sub-hub module 122 and the super speed sub-hub module 121 and coupled to the downstream ports 111-113 for performing data-format transformation between the USB 3.0 data and USB 2.0 data, and a controller 140 for controlling the operations of the super speed sub-hub module 121, the USB 2.0 sub-hub module 122 and USB 3.0 transaction translator 130 and selecting the slave device whose data will to be transformed according to the data formats supported by the host device and the slave devices. Note that in the embodiment of the invention, three of the downstream ports 111-113 are coupled to the USB 3.0 transaction translator 130. However, the invention should not be limited thereto. The amount of downstream ports coupled to the USB 3.0 transaction translator 130 may be less or more that three.

The USB 3.0 transaction translator 130 transforms the USB 2.0 data received from the USB 2.0 slave devices coupled to the downstream ports 111-113 to USB 3.0 data, and transforms the USB 3.0 data received from the super speed sub-hub module 121 to USB 2.0 data. The detailed structure of the USB 3.0 transaction translator 130 may refer to China Patent Application No. 201010129143.4, the entirety of which is incorporated by reference herein. Therefore, details of the USB 3.0 transaction translator are omitted here for brevity.

Note that in FIG. 1 and the following FIG. 2 to FIG. 5, the thick solid lines between the modules represent the super speed path 150 with bandwidth up to 5 Gbps, and the thin solid lines represent the USB 2.0 path 160 with bandwidth about 480 Mbps. In an embodiment of the invention, if the host device coupled to the upstream port 101 is detected supporting USB 3.0 and the slave devices coupled to the plurality of downstream ports 111-113 are detected supporting only the USB 2.0, the controller controls the USB 3.0 transaction translator 130 to perform data-format transformation from the USB 2.0 data of the slave devices supporting USB 2.0 to USB 3.0 data, so that the slave devices may transmit data to the host device via the super speed path 150 going through the USB 3.0 transaction translator 130 to the super speed sub-hub module 121, and then to the upstream port 101, and vice versa, for downstream data transmission.

In another embodiment of the invention, for some slave devices supporting only USB 2.0, the USB 2.0 data may be directly transmitted between the slave devices and the host device through the USB 2.0 path 160 without transforming. For example, a portion of the plurality of downstream ports (for example, the downstream port 114) may be directly coupled to the USB 2.0 sub-hub module 122 without passing through the USB 3.0 transaction translator 130. That is, the USB 2.0 slave device coupled to the downstream port 114 may transmit data to the host device via the USB 2.0 path 160 going through the downstream port 114 to the USB 2.0 sub-hub module 122, and then to the upstream port 101. In the embodiment of the invention, the USB 2.0 path 160 may support data transmission for only one USB 2.0 slave device, thereby the 480 Mbps bandwidth may be solely used by the USB 2.0 slave device for achieving the best transmission efficiency of the USB 2.0 slave device. In other embodiments of the invention, all of the downstream ports 111-114 may be coupled to the USB 3.0 transaction translator 130 so that all of the slave devices may transmit data to the host device via the super speed path 150 going through the USB 3.0 transaction translator 130 to the super speed sub-hub module 121, and then to the upstream port 101.

In an embodiment of the invention, when the host device coupled to the upstream port 101 is detected not supporting USB 3.0, and the slave devices coupled to the plurality of downstream ports 111-113 are detected supporting USB 2.0, the USB 3.0 transaction translator 130 may further comprise one or more bypass switches (not shown) for transmitting data without being transformed, so that the slave devices coupled to the plurality of downstream ports 111-113 may transmit data to the host device via the USB 2.0 path 160 going through the USB 3.0 transaction translator 130 to the USB 2.0 sub-hub module 122, and then to the upstream port 101, and vice versa, for downstream data transmission.

Figure 2:
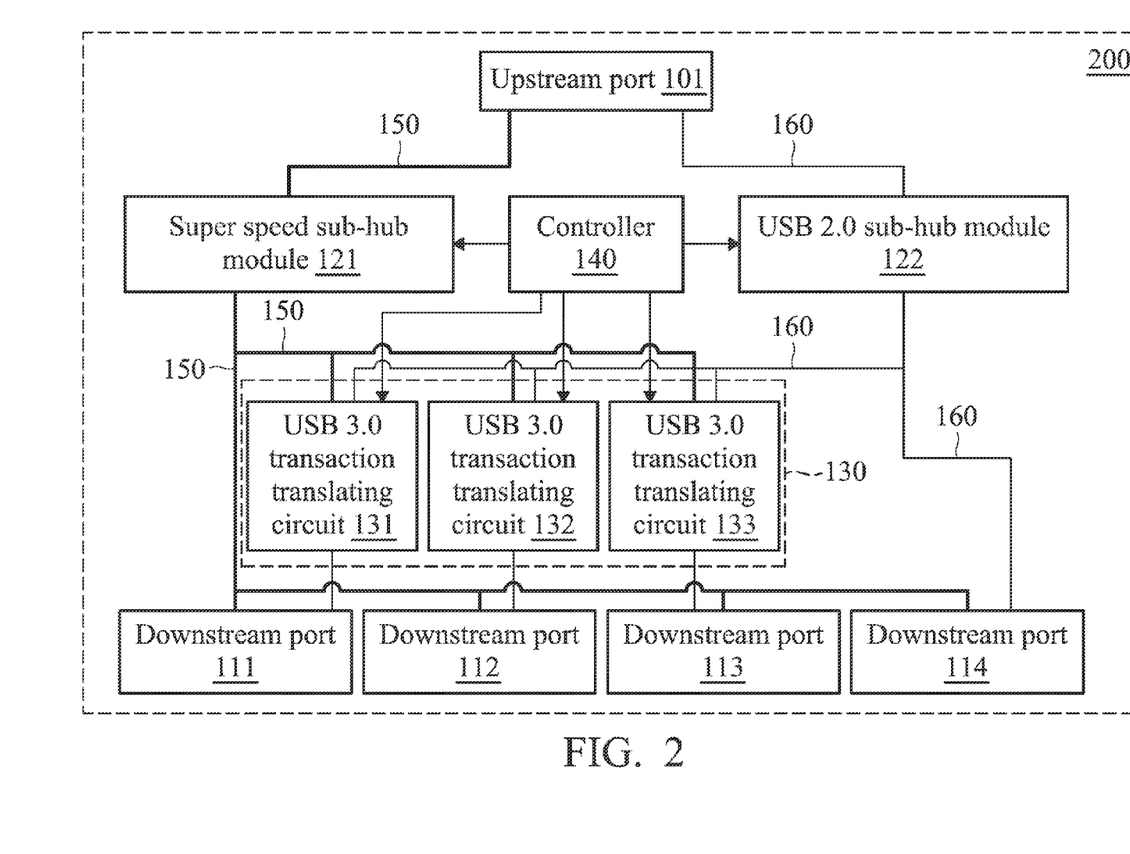
FIG. 2 shows a block diagram of a USB 3.0 hub device according to another embodiment of the invention.

FIG. 2 shows a block diagram of a USB 3.0 hub device 200 according to another embodiment of the invention. The difference between the USB 3.0 hub device 200 shown in FIG. 2 and the USB 3.0 hub device 100 shown in FIG. 1 is that the USB 3.0 hub device 200 comprises a plurality of transaction translating circuits 131-133 respectively corresponding to the plurality of downstream ports 111-113. Through the USB 3.0 transaction translating circuit each being provided for a dedicated downstream port, the parameters may be adjusted differently according to the properties of the slave devices so as to improve the signal quality and signal synchronization, and further increase the stability of the transmission path to avoid transmission errors.

Figure 3:
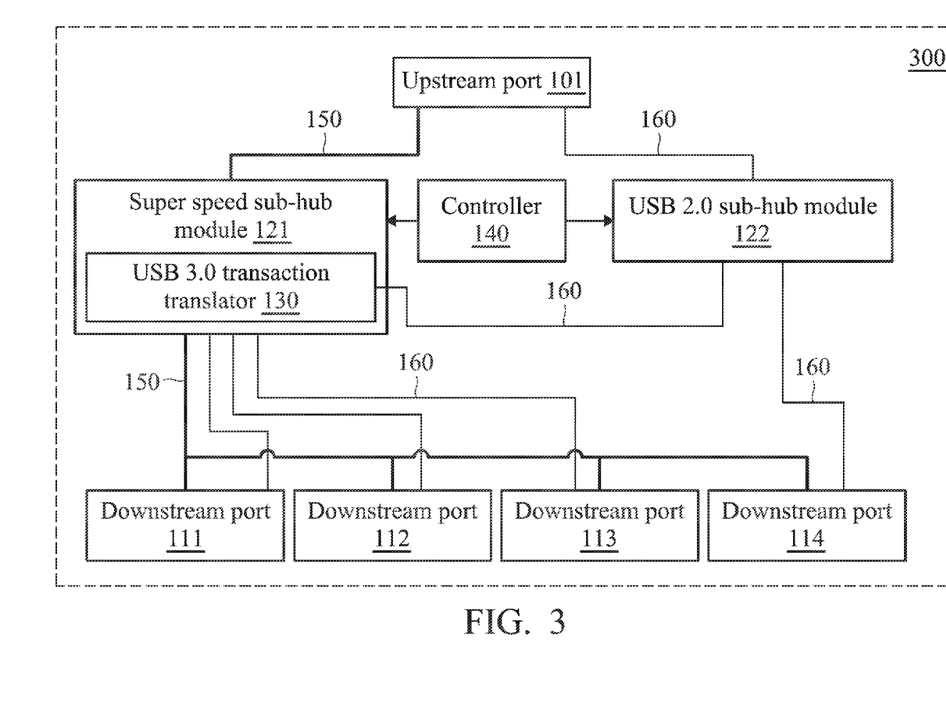
FIG. 3 shows a block diagram of a USB 3.0 hub device according to yet another embodiment of the invention.
Figure 4:
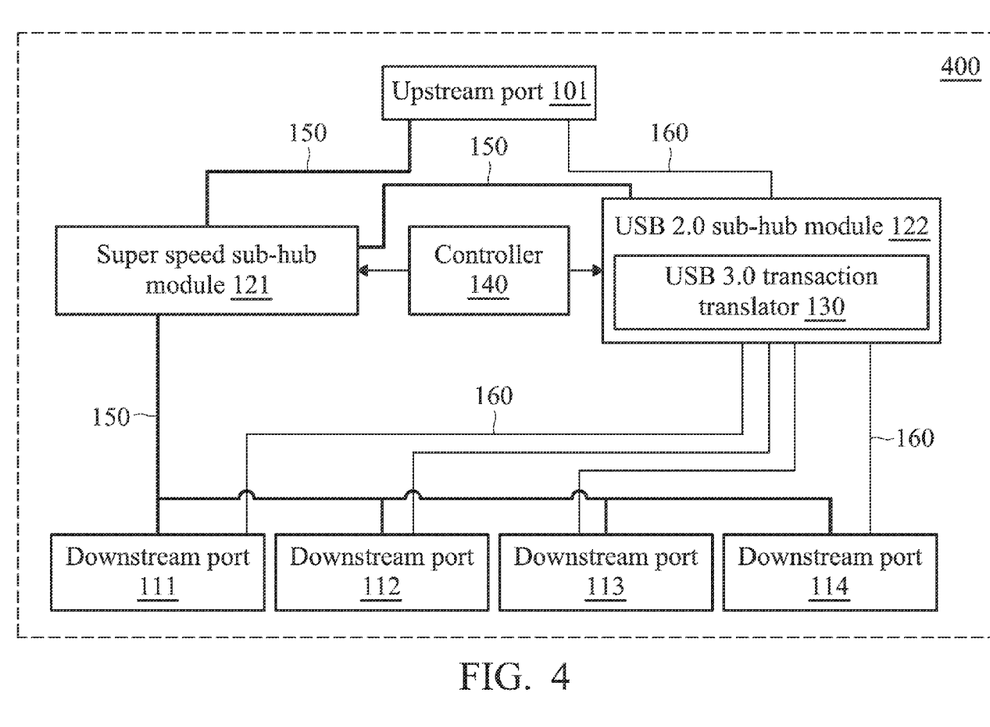
FIG. 4 shows a block diagram of a USB 3.0 hub device according to still another embodiment of the invention.

FIG. 3 shows a block diagram of a USB 3.0 hub device 300 according to yet another embodiment of the invention. FIG. 4 shows a block diagram of a USB 3.0 hub device 400 according to still another embodiment of the invention. Comparing the USB 3.0 hub device 100 as shown in FIG. 1, the USB 3.0 transaction translator 130 of the USB 3.0 hub device 300 is integrated in the super speed sub-hub module 121. Therefore, in the embodiment, an extra USB 2.0 path 160 is added between the super speed sub-hub module 121 and USB 2.0 sub-hub module 122. In FIG. 4, the USB 3.0 transaction translator 130 of the USB 3.0 hub device 400 is integrated in the USB 2.0 sub-hub module 122. Therefore, in the embodiment, an extra super speed path 150 is added between the super speed sub-hub module 121 and USB 2.0 sub-hub module 122. Note that, in other embodiments, different deployments of the USB 3.0 transaction translator in the USB 3.0 hub device may also be applied and the invention should not be limited thereto.

Figure 5:
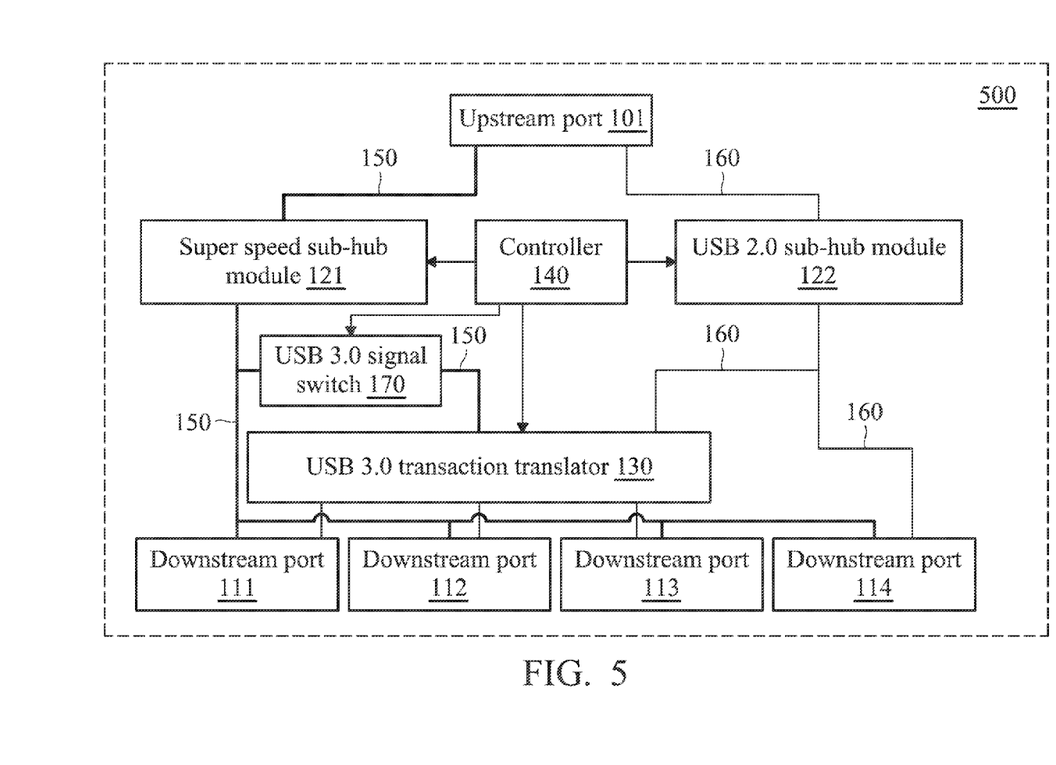
FIG. 5 shows a block diagram of a USB 3.0 hub device according to still another embodiment of the invention.

FIG. 5 shows a block diagram of a USB 3.0 hub device 500 according to still another embodiment of the invention. Comparing the USB 3.0 hub device 100 as shown in FIG. 1, the USB 3.0 hub device 500 as shown in FIG. 5 further comprises a USB 3.0 signal switch 170 coupled between the USB 3.0 transaction translator 130 and the super speed sub-hub module 121 for turning on or off in response to the control of the controller 140, so as to conduct or cut off the super speed path 150 between the USB 3.0 transaction translator 130 and the super speed sub-hub module 121.

Figure 6:
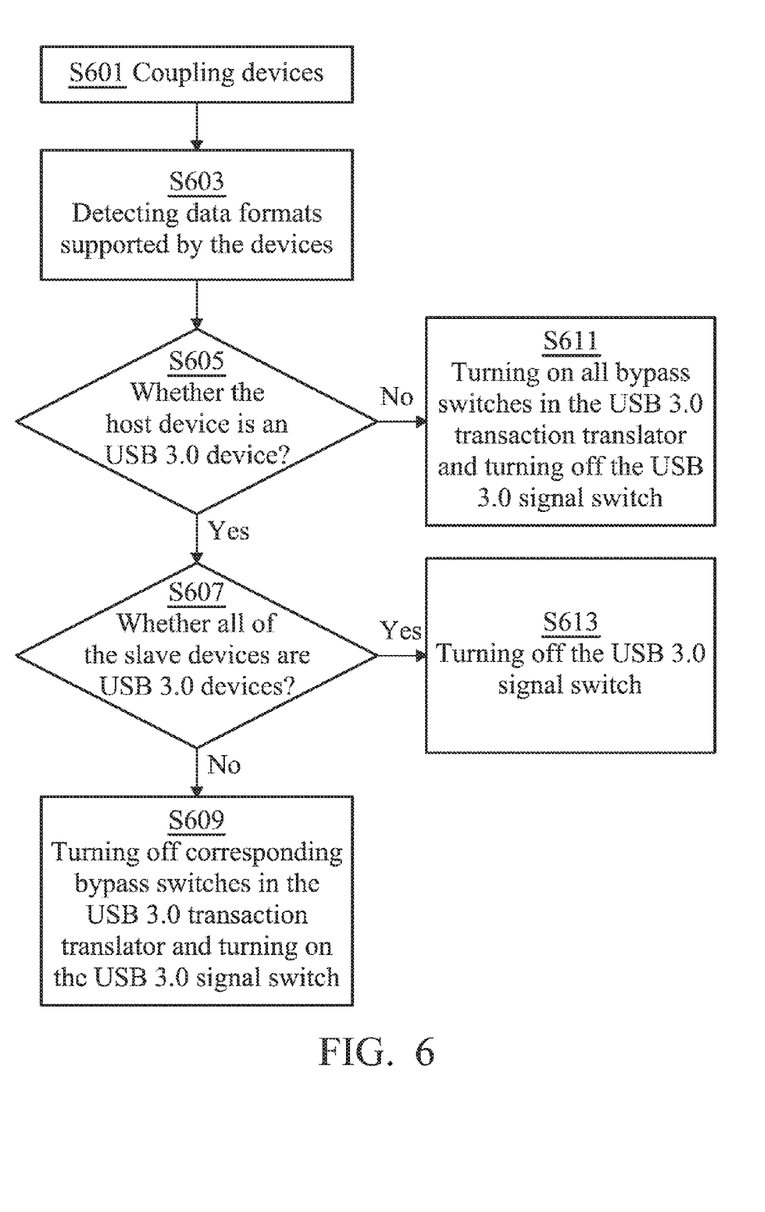
FIG. 6 shows a flow chart of a data transmission method for the USB 3.0 hub device 500 as shown in FIG. 5.

FIG. 6 shows a flow chart of a data transmission method for the USB 3.0 hub device 500 as shown in FIG. 5.

Referring to FIG. 6, in step S601, a host device is coupled to the upstream port 101 of the USB 3.0 hub device 500 and at least one slave device is coupled to at least one of the downstream ports 111-114. In step S603, the data-format detector of the USB 3.0 hub device 500 detects the data format supported by the host device and the slave device(s), that is, to detect whether the host device and the slave device support USB 3.0. In one embodiment, the data-format detector may be implemented inside of the USB 3.0 transaction translator 130. In other embodiments of the invention, the data-format detector may be implemented inside of the controller 140.

In step S605, the controller checks whether the host device supports USB 3.0. If the host device is not a USB 3.0 device, in step S611, the controller 140 turns on all of the bypass switches in the USB 3.0 transaction translator 130 and turns off the USB 3.0 signal switch 170. Thereby, the slave devices coupled to the downstream ports 111-113 transmit data to the USB 2.0 host device via the path going through the downstream ports 111-113 to the bypass switches in the USB 3.0 transaction translator 130, and then through the USB 2.0 sub-hub module 122, the USB 2.0 upstream bus, and finally to the upstream port 101 (that is, the thin solid line of USB 2.0 path 160 as shown in FIG. 5). The slave device coupled to the downstream port 114 transmits data to the USB 2.0 host device via the USB 2.0 path 160 going through the downstream port 114 to the USB 2.0 sub-hub module 122 and finally to the upstream port 101.

If the host device is a USB 3.0 device, in step S607, the data-format detector further checks whether all of the slave devices coupled to the downstream ports 111-114 are USB 3.0 devices. If so, in step S613, the controller 104 turns off the USB 3.0 signal switch 170. Thereby, all of the USB 3.0 slave devices coupled to the downstream ports 111-114 transmit data to the USB 3.0 host device via the super speed path 150 going through the super speed sub-hub module 121 and then to the upstream port 101.

If anyone of the slave devices coupled to the downstream ports 111-113 is USB 2.0 device, in step S609, the controller 140 turns off the bypass switch corresponding to the USB 2.0 slave device in the USB 3.0 transaction translator 130 and turns on the USB 3.0 signal switch 170. Thereby, the USB 2.0 slave device coupled to the downstream ports 111-113 transmits data to the host device via the path going through the USB 3.0 transaction translator 130, the USB 3.0 signal switch 170, the super speed sub-hub module 121 and then to the upstream port 101 (that is, the thick solid line of super speed path 150 as shown in FIG. 5), wherein USB 3.0 transaction translator 130 performs data format translation on the transmitted data. Note that in FIG. 2, there is a plurality of USB 3.0 transaction translating circuits 131-133 each corresponding to one of the downstream ports 111-113. Therefore, in the flow chart corresponding to FIG. 2, the data-format detector in each transaction translating circuit 131-133 respectively performs step S607, to determine whether the slave device coupled to the corresponding downstream port is a USB 3.0 device.

While the invention has been described by way of example and in terms of preferred embodiment, it is to be understood that the invention is not limited thereto. Those who are skilled in this technology can still make various alterations, combinations, sub-combinations and modifications without departing from the scope and spirit of this invention. Therefore, the scope of the present invention shall be defined and protected by the following claims and their equivalents.

What is claimed is:

1. A hub device, comprising:
   an upstream port, coupled to a host device supporting a first data format and/or a second data format;
   a plurality of downstream ports, each coupled to one of a plurality of slave devices supporting the first data format and/or the second data format;
   a first sub-hub module, supporting transmission of data in the first data format between the plurality of downstream ports and the upstream port;
   a second sub-hub module, supporting transmission of data in the second data format between the plurality of downstream ports and the upstream port;
   a data-format detector, detecting data format supported by the host device and the slave devices;
   a transaction translator, coupled between the first sub-hub module and the second sub-hub module and coupled to at least one of the plurality of downstream ports for transforming the data format between the first data format and the second data format; and
   a controller, controlling operations of the first sub-hub module, the second sub-hub module and the transaction translator, and determining whether to control the transaction translator to perform data-format transformation between the first data format and the second data format according to the data format supported by the host device and the slave devices,
   wherein when the host device coupled to the upstream port is detected supporting the second data format, the controller controls the data in the second data format to be transmitted directly through the second sub-hub module between the slave devices and the host device without passing through the first sub-hub module.

2. The hub device as claimed in claim 1, wherein the first data format is universal serial bus (USB) 3.0 and the second data format is USB 2.0 or 1.1.

3. The hub device as claimed in claim 1, wherein when the host device coupled to the upstream port is detected supporting the first data format and one of the slave devices coupled to one of the plurality of downstream ports is detected supporting the second data format, the controller controls the transaction translator to perform data-format transformation between the second data format of the slave device and the first data format of the host device.

4. The hub device as claimed in claim 1, wherein when the host device coupled to the upstream port is detected supporting the first data format and one of the slave devices coupled to one of the plurality of downstream ports is detected supporting the first data format, the controller controls the data in the first data format to be transmitted directly through the first sub-hub module between the slave device supporting the first data format and the host device.

5. The hub device as claimed in claim 1, wherein the data in the second data format is transmitted directly through the second sub-hub module between the host device and one of the slave devices supporting the second data format and coupled to a specific downstream port, and the data in the first data format is transmitted directly through the first sub-hub module between the host device and the one of the slave devices supporting the first data format and coupled the specific downstream port,
   wherein the specific downstream port is one of the downstream ports, and the specific downstream port is not coupled to the transaction translator.

6. The hub device as claimed in claim 1, wherein the transaction translator further comprises a bypass switch, and when the host device coupled to the upstream port is detected supporting the second data format, the bypass switch is turned on to directly couple the at least one of the plurality of downstream ports to the second sub-hub module.

7. The hub device as claimed in claim 1, further comprising a signal switch coupled between the first sub-hub module and the transaction translator, and when the host device coupled to the upstream port is detected supporting the first data format and one of slave devices coupled to one of the plurality of downstream ports is detected supporting the second data format, the signal switch is turned on so as to conduct a signal transmission path between the first sub-hub module and the transaction translator for transforming the data format between the first data format and the second data format.

8. The hub device as claimed in claim 1, wherein the transaction translator comprises a plurality of transaction translating circuits respectively corresponding to one of the plurality of downstream ports.

9. The hub device as claimed in claim 1, wherein the transaction translator is comprised in the first sub-hub module.

10. The hub device as claimed in claim 1, wherein the transaction translator is comprised in the second sub-hub module.

11. A data transmission method for a hub device, the hub device comprising an upstream port coupled to a host device supporting a first data format and/or a second data format, a plurality of downstream ports each coupled to one of a plurality of slave devices supporting the first data format and/or the second data format, a first sub-hub module supporting transmission of data in the first data format between the plurality of downstream ports and the upstream port, and a second sub-hub module supporting transmission of data in the second data format between the plurality of downstream ports and the upstream port, and the method comprising:
   detecting data format supported by the host device and the slave devices;
   when the host device coupled to the upstream port is detected supporting the first data format and one of the slave devices coupled to one of the plurality of downstream ports is detected supporting the second data format, performing data-format transformation between the data in the second data format and the data in the first data format, so that the one of the slave devices supporting the second data format performs data transmission with the host device via the first sub-hub module; and
   when the host device coupled to the upstream port is detected supporting the second data format, transmitting the data in the second data format directly through the second sub-hub module between the slave devices and the host device without passing through the first sub-hub module.

12. The data transmission method as claimed in claim 11, wherein the first data format is universal serial bus (USB) 3.0 and the second data format is USB 2.0 or 1.1.

13. The data transmission method as claimed in claim 11, further comprising: when the host device coupled to the upstream port is detected supporting the first data format and the one of the slave devices coupled to the one of the plurality of downstream ports is detected supporting the first data format, transmitting the data in the first data format directly through the first sub-hub module between the slave device supporting the first data format and the host device.

14. The data transmission method as claimed in claim 11, further comprising: transmitting the data in the second data format directly through the second sub-hub module between the host device and one of the slave devices supporting the second data format and coupled to a specific downstream port, and transmitting the data in the first data format directly through the first sub-hub module between the host device and the one of the slave devices supporting the first data format and coupled the specific downstream port, wherein the specific downstream port is one of the downstream ports, and the specific downstream port is not coupled to a transaction translator, which performs the data-format transformation.

15. The data transmission method as claimed in claim 11, further comprising: when the host device coupled to the upstream port is detected supporting the second data format, bypassing the data in the second data format directly to/from the second sub-hub module.

16. The data transmission method as claimed in claim 11, further comprising: conducting a signal transmission path for performing the data-format transformation when the host device coupled to the upstream port is detected supporting the first data format and the one of the slave devices coupled to the one of the plurality of downstream ports is detected supporting the second data format.

* * * * *